United States Patent
Herring et al.

(10) Patent No.: US 8,147,600 B2
(45) Date of Patent: Apr. 3, 2012

(54) PRESSURE-BASED DISSOLVED GAS REMOVAL SYSTEM

(75) Inventors: Neal R. Herring, Vernon, CT (US); Arindam Dasgupta, West Hartford, CT (US); Haralambos Cordatos, Colchester, CT (US); Thomas G. Tillman, West Hartford, CT (US); Jeremiah C. Lee, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 409 days.

(21) Appl. No.: 12/411,621

(22) Filed: Mar. 26, 2009

(65) Prior Publication Data

US 2010/0242736 A1    Sep. 30, 2010

(51) Int. Cl.
  *B01D 19/00*    (2006.01)
(52) U.S. Cl. ................ 96/174; 96/193; 96/194
(58) Field of Classification Search .......... 96/174, 96/193, 194
  See application file for complete search history.

(56) References Cited

U.S. PATENT DOCUMENTS

| | | | |
|---|---|---|---|
| 2,765,045 A * | 10/1956 | Meyers | ............................ 95/176 |
| 4,609,385 A | 9/1986 | Burgess | |
| 4,872,530 A | 10/1989 | Burgess | |
| 4,957,187 A | 9/1990 | Burgess | |
| 5,880,378 A * | 3/1999 | Behring, II | ................. 73/861.53 |
| 5,980,613 A * | 11/1999 | Reiber | ............................. 95/246 |
| 6,054,046 A * | 4/2000 | Nelson | ........................... 210/194 |
| 6,129,523 A | 10/2000 | Ruhnke | |
| 6,193,893 B1 * | 2/2001 | Mazzei et al. | ................. 210/702 |
| 6,315,815 B1 | 11/2001 | Spadaccini et al. | |
| 6,823,878 B1 | 11/2004 | Gadini | |
| 7,334,407 B2 | 2/2008 | Spadaccini et al. | |
| 7,393,388 B2 | 7/2008 | Spadaccini et al. | |
| 7,413,818 B2 | 8/2008 | Tsuboyama et al. | |
| 7,465,336 B2 | 12/2008 | McHugh | |
| 2005/0180901 A1 | 8/2005 | Vanderspurt et al. | |
| 2006/0080961 A1 | 4/2006 | Paradise | |

FOREIGN PATENT DOCUMENTS

| | | |
|---|---|---|
| DE | 869041 C | 3/1953 |
| GB | 308010 A | 3/1929 |

OTHER PUBLICATIONS

European Search Report mailed on Jun. 25, 2010 for EP10250292.

* cited by examiner

*Primary Examiner* — Duane Smith
*Assistant Examiner* — Douglas Theisen
(74) *Attorney, Agent, or Firm* — Carlson Gaskey & Olds

(57) ABSTRACT

A fuel gas removal system includes a venturi for reducing a pressure of the fuel, a bubble separator containing media to assist in the formation of gas bubbles within the fuel to separate the gas bubbles from the fuel, and a port to remove gas bubbles created by the reduction of pressure of the fuel and the bubble separator.

7 Claims, 1 Drawing Sheet

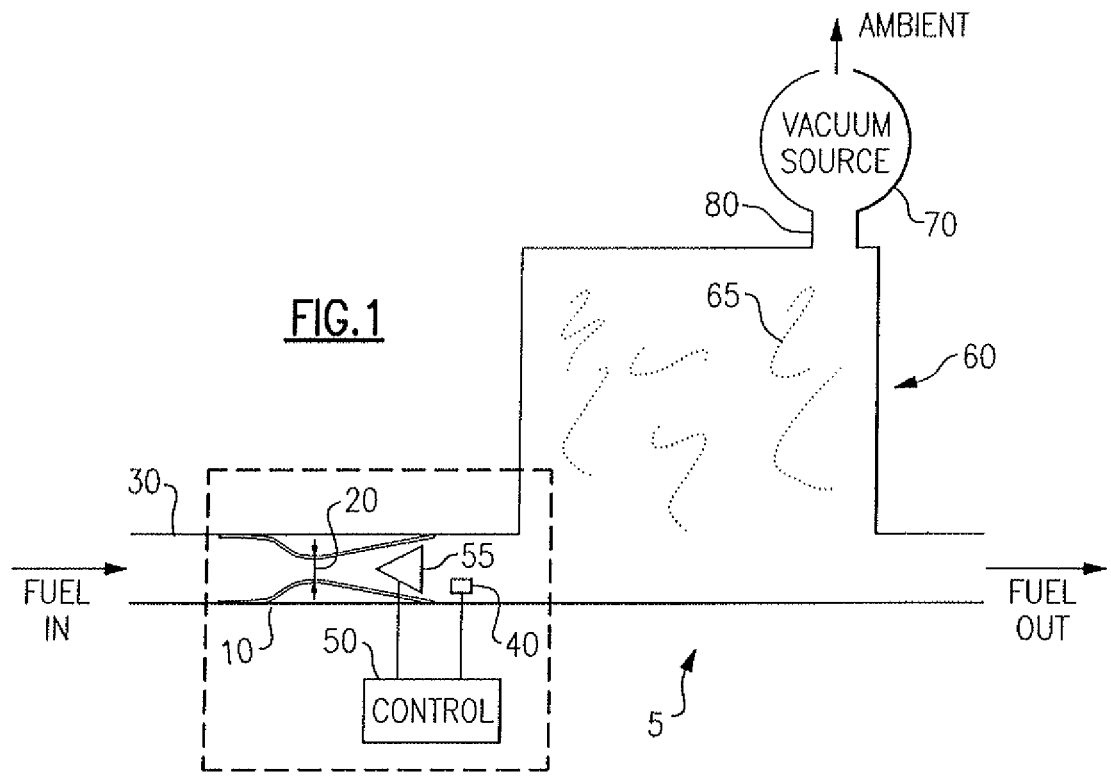
FIG.1
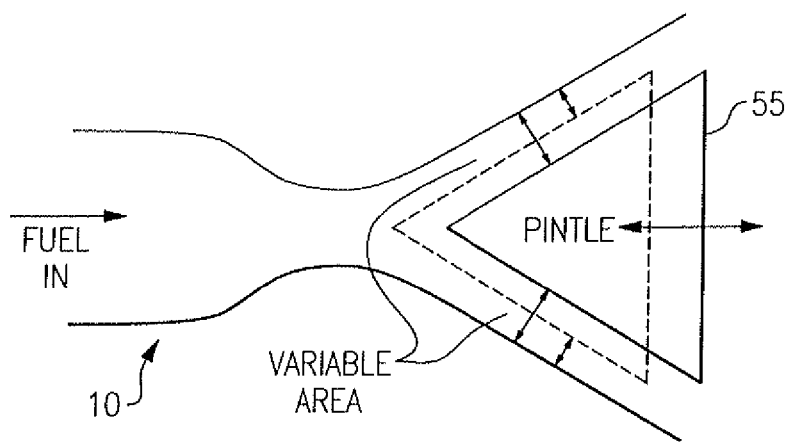
FIG.2
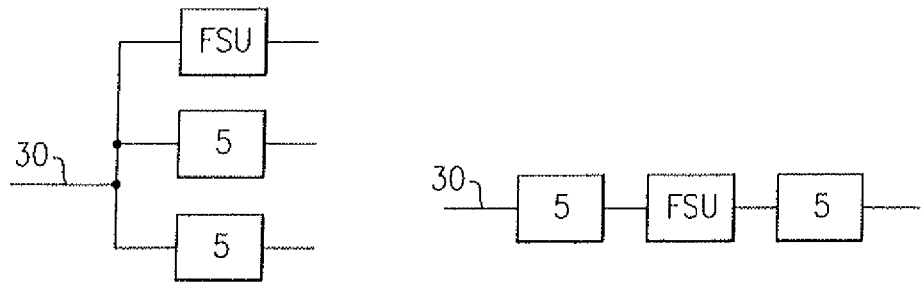
FIG.3
FIG.4

PRESSURE-BASED DISSOLVED GAS REMOVAL SYSTEM

BACKGROUND OF THE INVENTION

Large commercial gas turbine engines benefit from removing dissolved oxygen from the fuel. The temperature to which fuel can be heated without creating coke is a function of the dissolved oxygen content of the fuel. Removing dissolved oxygen allows the fuel to be heated to higher temperatures without creating coke in the fuel system. This has been accomplished in the past with membrane-based fuel stabilization units (FSU).

Some FSU include a plurality of permeable membranes spirally wound about an exhaust tube for removing dissolved oxygen from hydrocarbon fuel. Permeable membranes are spirally wrapped about the exhaust tube and define fuel passages and exhaust passages for removing the oxygen. Fuel passages and exhaust passages alternate such that each fuel passage is mounted on each adjacent side by an exhaust passage. An oxygen partial pressure differential is generated across the permeable membrane to draw dissolved oxygen from fuel in the fuel passage. The dissolved oxygen is then communicated through openings about the circumference of the exhaust tube and out of the deoxygenator.

Further, a typical separator for separating air from water draws water into a chamber filled with separation media, such as marbles, wire mesh, or crumpled wire to slow the water before it is drawn out of the chamber. The separation media serves to allow separated air to be removed and be vented from the top of the system.

SUMMARY OF THE INVENTION

A fuel gas removal system includes a venturi for reducing the pressure of the fuel, a bubble separator containing media to assist in the formation of gas bubbles within the fuel and to separate the gas bubbles therefrom, and a port to remove gas bubbles created by the reduction of pressure of the fuel and the bubble separator.

Other features of the present invention in addition to those mentioned above, will be understood from the following detailed description provided in conjunction with the accompanying drawings.

BRIEF DESCRIPTION OF THE DRAWINGS

FIG. 1 is a perspective view of the invention of a bubble separator in combination with the variable venturi are shown.
FIG. 2 is a schematic drawing of a variable area venturi.
FIG. 3 is a schematic drawing of a plurality of gas removal devices arranged in parallel.
FIG. 4 is a schematic drawing of a plurality of gas removal devices arranged in series.

DETAILED DESCRIPTION OF THE PREFERRED EMBODIMENT

Referring to FIG. 1, the fuel gas removal system 5 of the invention includes a variable venturi 10, a bubble separator 60 and a port 80.

Referring now to FIGS. 1 and 2, the venturi 10 has a variable throat area 20, a controller 50, a variably positionable pintle 55 and a downstream sensor 40.

Depending on a desired rate of the flow though an inlet pipe 30, the throat area 20 of the venturi 10 is varied by moving pintle 55 (by known means not shown) so that the fuel velocity and thus static pressure is varied. Reduced static pressure creates a driving force for gases, including oxygen, to come out of solution and form bubbles. Bubble nucleation processes require finite time, and varying the venturi geometry by moving the pintle 50 allows for adequate time for the formation of the bubbles. Flow sensor 40 downstream of the venturi measures the static pressure in the pipe 30 and sends a signal to a controller 50, which resides within the venturi. The controller then sends a signal to the venturi to vary the area downstream of the throat by positioning pintle 55 so that the velocity of the fluid flowing through the venturi creates a consistent static pressure across a wide range of fuel flow.

Once bubbles have formed, the flow enters a separation device 60 containing separation media 65 such as wire mesh, pebbles or crumpled wire (one of ordinary skill in the art will recognize that other suitable material are available for use herein). This device creates a low velocity region that allows formed bubbles to collect and rise for removal. The combination of reduced pressure to create bubbles and then subsequent removal of the bubbles in the system 5 enables the system to remove the requisite amount of gases, including oxygen, from the fuel.

Removal of the collected gas requires a vacuum source 70 attached to the system via port 80, to draw off the accumulated air and oxygen in the system before the fuel is sent along towards the engine. The vacuum source must be capable of driving the gases from the low pressure fuel system to ambient for exhaust.

Thermodynamic modeling shows that a system capable of reaching fuel pressures of approximately 0.3 bar could reduce the dissolved oxygen content in the fuel to 25 parts per million weight. By using the variable venturi, and the bubble separator, and the port 80, the amount of oxygen can be removed by a remarkably small system. The system may be used in conjunction with known FSU or other systems 5, either in series (as an example shown in FIG. 3) or in parallel (as an example shown in FIG. 4), and may facilitate the use of smaller fuel stabilization units in conjunction with this invention. This is important for gas turbine engines used on aircraft to lower the overall weight of the fuel delivery system for fuel economy. Further, the system 5 could be both made from a variety of materials to optimize weight and reliability. The system 5 could be incorporated into a fuel system either upstream or downstream of a low pressure pump that would involve little change to a typical engine thermal management system (not shown).

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A fuel gas removal system comprising:
   a venturi configured to reduce a pressure of a fuel said venturi having a variable opening operable to control a flow of said fuel therethrough, whereby a flow of fuel therethrough is maintained at a relatively constant static pressure,
   a bubble separator containing media to assist in a formation of gas bubbles within the fuel to separate the gas bubbles therefrom,
   a sensor for sensing a rate of fuel flow downstream of said venturi and upstream of said bubble separator, and
   a port to remove gas bubbles created by the reduction of the pressure of the fuel and said bubble separator.
2. The system of claim 1 further comprising:
   an inlet line in fluid communication with said venturi,
   a controller for receiving signals from said sensor and for controlling said variable opening in response to said signals so that the fuel in said inlet line flows at a relatively constant rate through said venturi.

3. A system comprising:
a plurality of fuel gas removal systems of claim 1 arranged serially or in parallel or in combination with an FSU.

4. The system of claim 1 wherein said variable opening further comprises:
a throat and
a valve that varies an area of said throat.

5. The system of claim 4 wherein said valve is arranged downstream of said throat.

6. The system of claim 1 wherein said system further comprises:
a vacuum source in communication with said port for removing the gas bubbles.

7. The system of claim 2 wherein said controller is located in close proximity to said sensor and said venturi.

\* \* \* \* \*